Feb. 11, 1930. J. C. LUSSE 1,747,122
MOTOR VEHICLE
Filed July 15, 1926 7 Sheets-Sheet 3

Inventor:-
Joseph C. Lusse,
by his Attorneys,
Howson & Howson

Feb. 11, 1930.   J. C. LUSSE   1,747,122
MOTOR VEHICLE
Filed July 15, 1926   7 Sheets-Sheet 4

Inventor,
Joseph C. Lusse,
by his Attorneys,
Howson & Howson

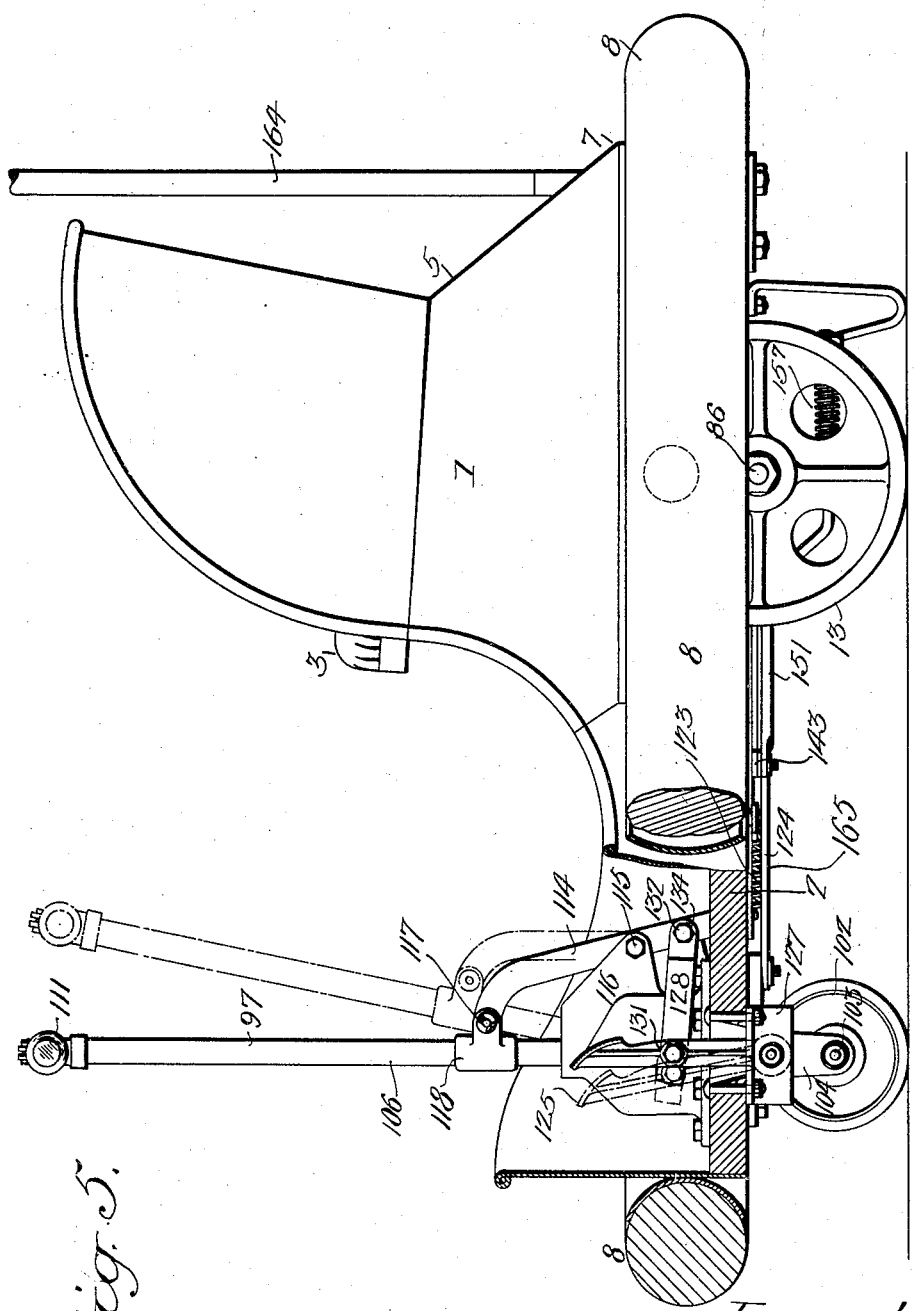

Feb. 11, 1930.　　　J. C. LUSSE　　　1,747,122
MOTOR VEHICLE
Filed July 15, 1926　　　7 Sheets-Sheet 6
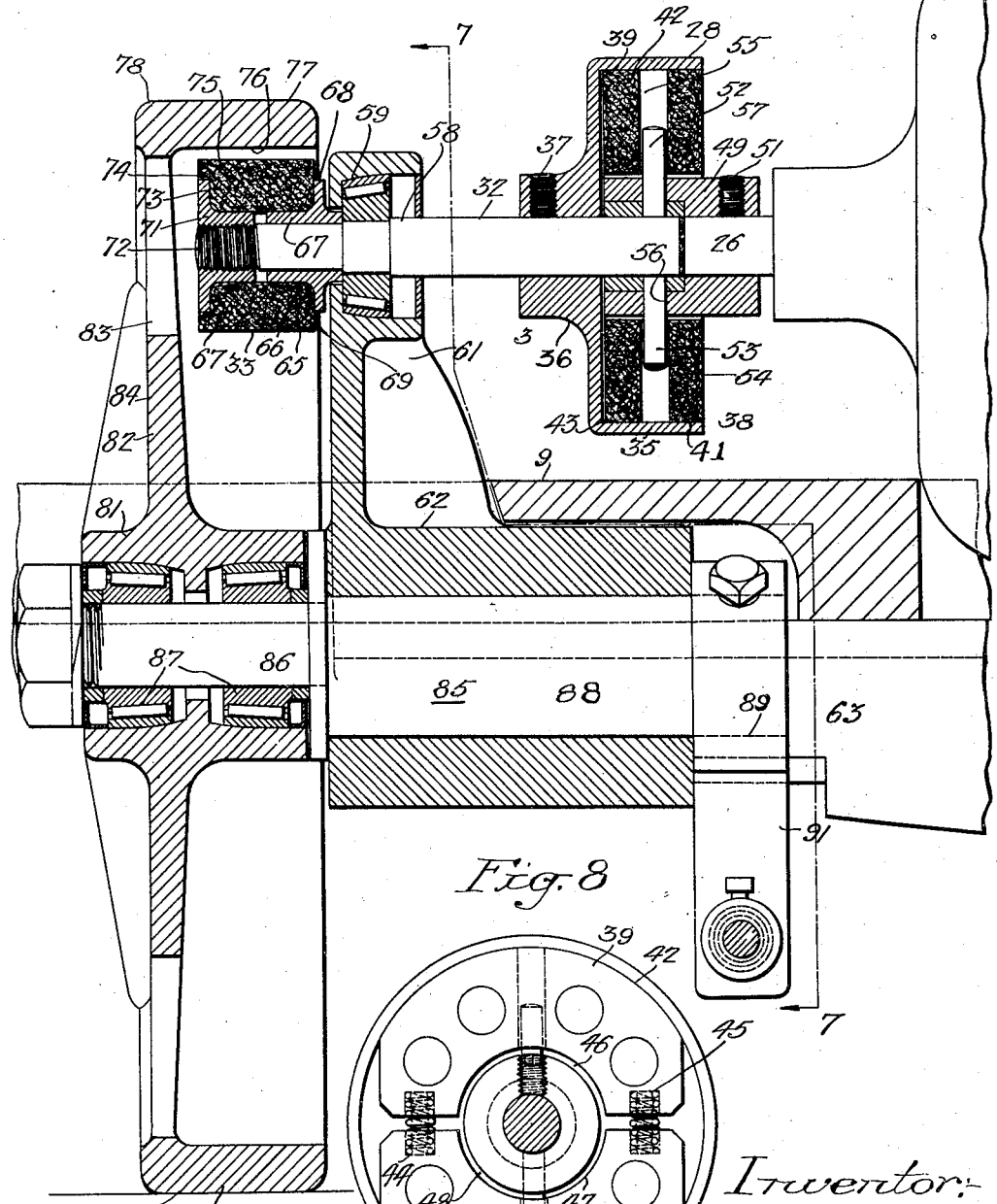

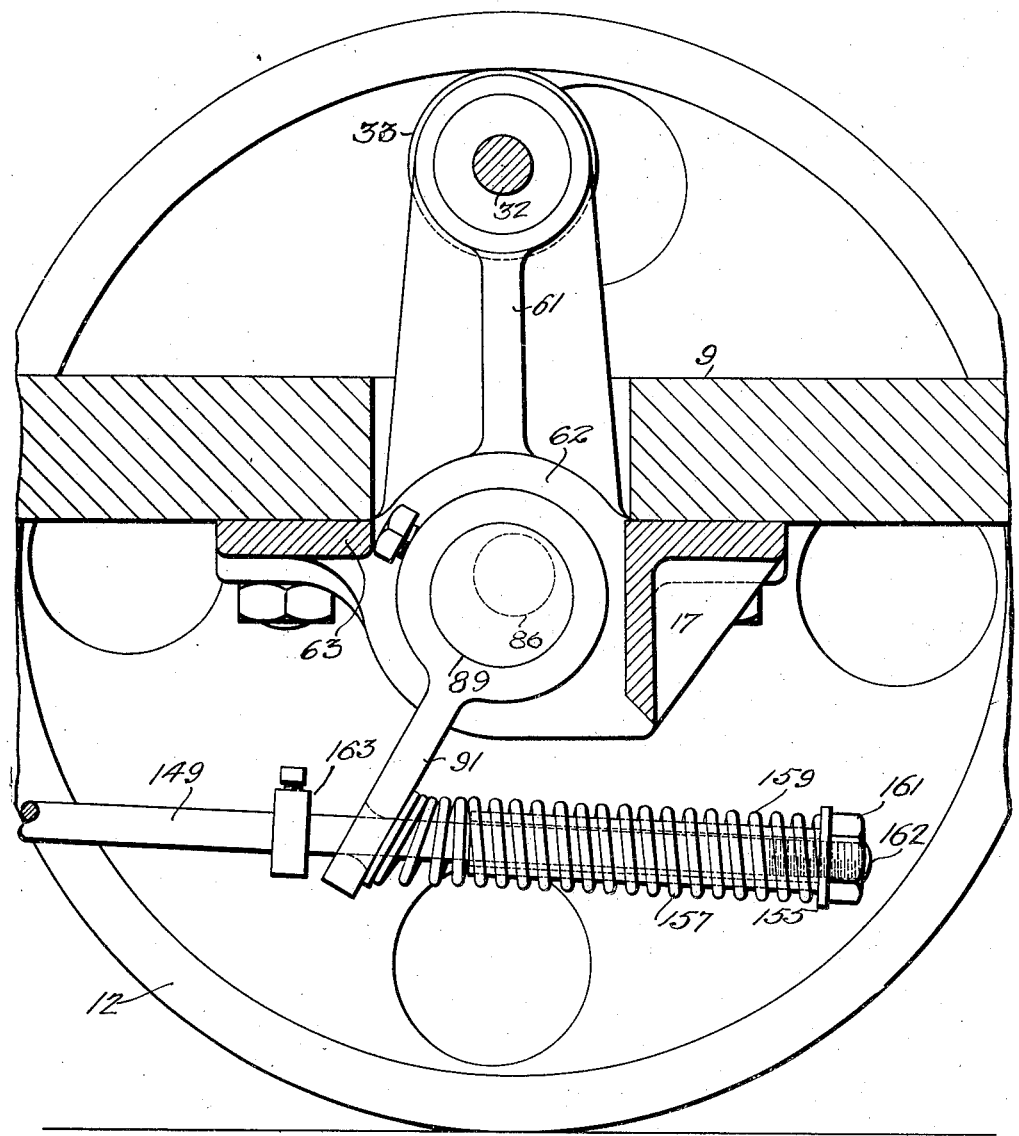

Patented Feb. 11, 1930

1,747,122

UNITED STATES PATENT OFFICE

JOSEPH C. LUSSE, OF PHILADELPHIA, PENNSYLVANIA

MOTOR VEHICLE

Application filed July 15, 1926. Serial No. 122,634.

My invention relates to motor vehicles and it has particular relation to such vehicles as are applicable to amusement parks.

In its broad aspect, one object of my invention is to provide a car of the above type that shall be characterized by its simplicity of design, rigidity of construction and absence of undesirable operating noises.

A more specific object of my invention is to provide improved propelling and controlling apparatus, whereby the car may be turned on a circle of its own length in either direction with a minimum effort on the part of the driver.

Another object of my invention is to provide a steering device, wherein the wheel may turn about a vertical axis. Such construction overcomes the undesirable feature of tilting the steering wheel from one face edge to the other during the steering operation and thus eliminates the usual replacements of damaged steering wheels and broken steering-fork stems.

A further object of my invention is to provide a car with a pair of driving wheels, guiding means for the wheels and simple and compact mechanism under the control of the operator, whereby the driving effect of said wheels may be simultaneously or independently varied.

Other objects and applications of my invention, as well as details of construction and operation, whereby my invention may be practiced, will appear more fully hereinafter, when taken in connection with the accompanying drawings, wherein—

Fig. 5 is a side elevational view of the structure of Fig. 1 with the front portion of the car body removed to illustrate the foot control pedal;

Fig. 6 is an enlarged detail transverse sectional view taken on the line VI—VI of Fig. 1;

Fig. 7 is a longitudinal sectional view of the structure of Fig. 6, taken on the line VII—VII thereof, but showing the driving friction element in engagement with the wheel; and Fig. 8 is a side elevational view of the clutch of Fig. 6.

Figure 1:
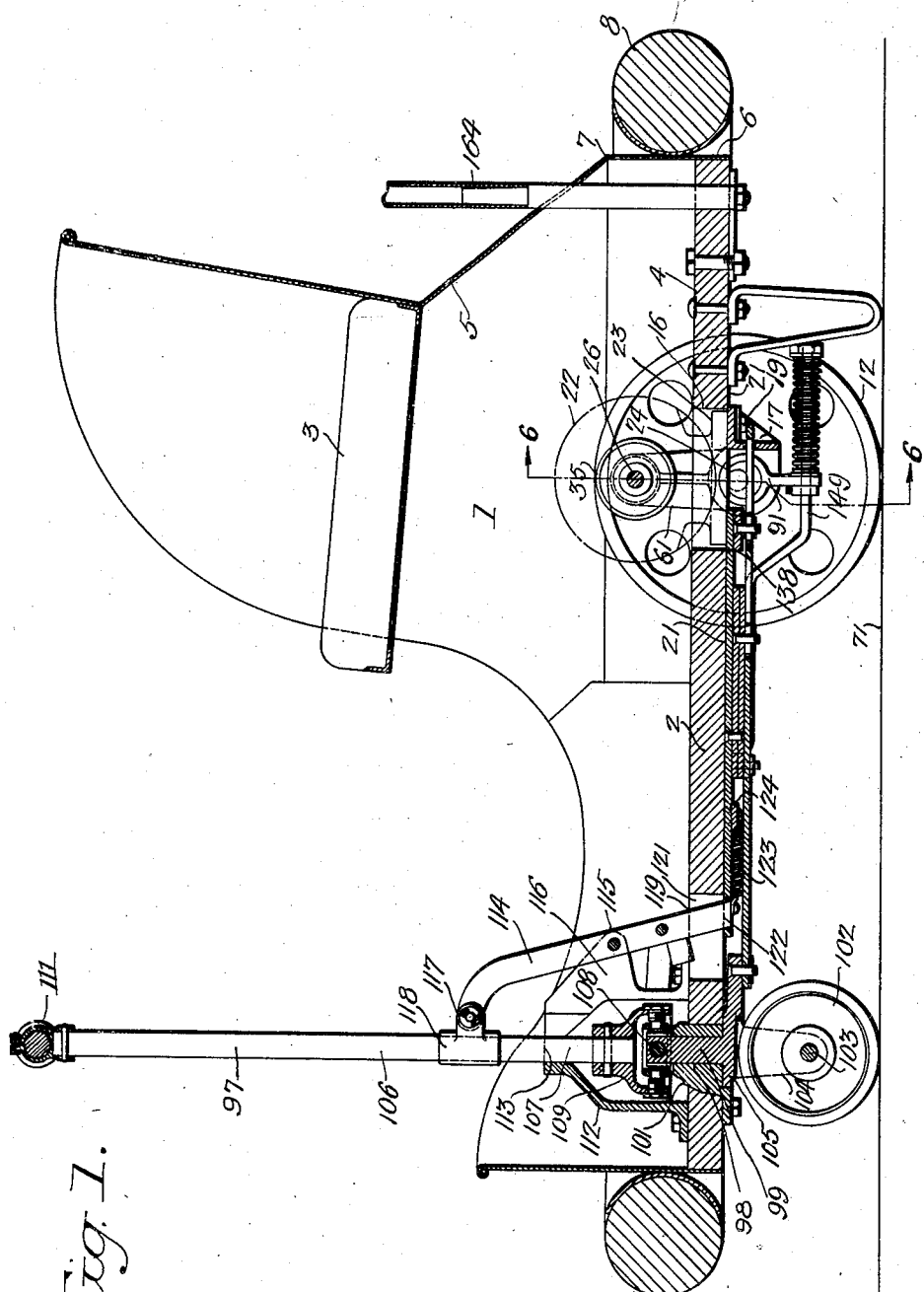
Fig. 1 is a longitudinal sectional view of a car embodying my invention, the sectional plane being taken on the line I—I of Fig. 2.

In the illustrated embodiment of my invention shown in the drawing, the car body 1 comprises a platform 2 having a seat 3 adjacent to a rear end 4 thereof mounted on a supporting structure 5 secured to an outer edge 6 of said platform 2, a lower section 7 of the structure 5 being provided with a suitable shock resisting bumper 8 which completely encircles the car.

Figure 3:
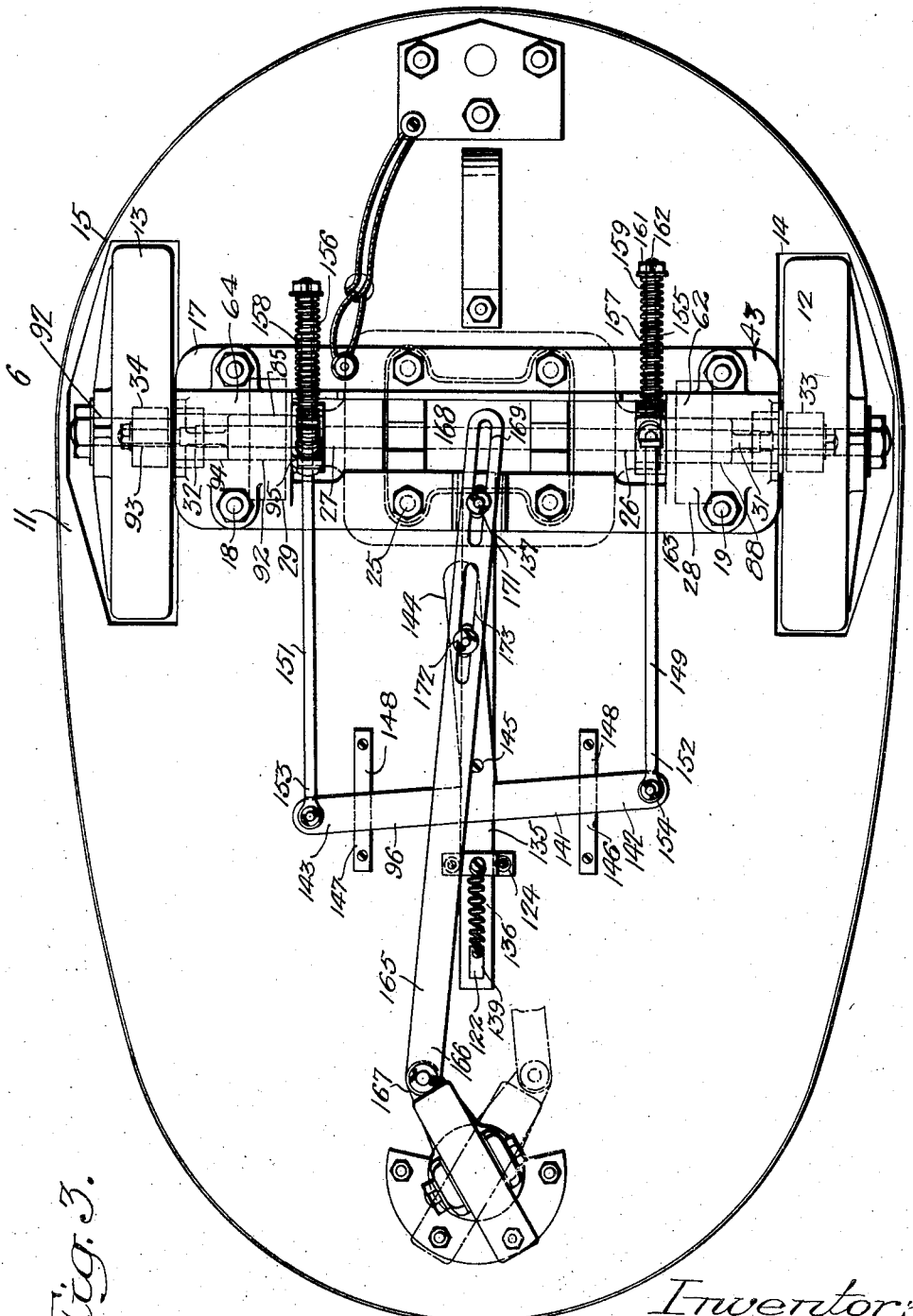
Fig. 3 is an inverted plan view of the structure of Fig. 1, showing the relative positions of the steering wheel and the control linkage when the former is in a position to cause the car to traverse a curved path and the swinging section of the steering post is in its mid position.

Opposite sides 9 and 11 of the rear end 4 of the platform 2 may be supported by traction wheels 12 and 13, which extend up into the body of the car through recesses 14 and 15 formed in the platform 2, respectively. The longitudinally extending recesses 14 and 15 may be interconnected by a transversely extending recess 16. One side of the recess 16 may be partially closed by an elongated bracket member 17 secured by pairs of bolts 18 and 19 (Fig. 3) to an underside 21 of the platform 2. A driving motor 22 is so mounted that a base 23 thereof is supported in an enlarged portion of the recess 16, as shown in Fig. 1, on an upper side 24 of the bracket member 17 and secured in position by bolts 25 (Fig. 3). The driving motor 22 is provided with oppositely extending shaft sections 26 and 27 which are respectively connected to clutches 28 and 29 through aligned shaft sections 31 and 32 terminating in driving elements 33 and 34, respectively.

Each of the clutches, which are designed to disconnect the driving motor 22 from its driving element 33 or 34 when the torque of the latter extends a predetermined value, may comprise a casing 35 having a hub 36 secured to, say, the shaft section 32, by means of a set screw 37 as shown in Figs. 6 and 8. An inner surface 38 of the casing 35 provides a frictional surface for a pair of shoes 39 and 41 having a surface 42 and 43 complementary to said inner casing surface 38. The shoes 39 and 41 may be separated by springs 44 and 45 to cause a predetermined frictional engagement between the shoe surfaces 41 and 42 and the casing surface 38 when the driving element 31 is operated at a minimum speed. However, for higher speeds, the shoes 39 and 41 operate under the action of centrifugal force to establish a greater frictional contact between the shoes 39, 41 and the casing 35. The shoes 39, 41 are provided with recesses 46 and 47 forming a central aperture 48 for the reception of a sleeve 49 secured by a set screw 51 to the motor shaft section 26. The rotation of the sleeve 49 may be transmitted to the shoes 39 and 41 to cause a desired centrifugal action by means of a pair of oppositely extending pins 52 and 53 which are respectively mounted in apertures 54 and 55 formed in the shoes 39 and 41 and apertures 56 and 57.

An outer end 58 of the shaft section 32 is journaled in a bearing 59 mounted in an upper end portion of an extension 61 from an eccentric bearing 62 supported on an adjacent side portion 63 of the bracket member 17, as shown in Figs. 6 and 7. The driving shaft section 32 for the opposite frictional driving element 34 is similarly mounted on an eccentric bearing 64. The friction driving element 33 may comprise an annular member 65, an inner side 66 of which is mounted on a supporting bushing 67 having a flange 68 adapted to engage a rear side 69 of said annular member. A nut 71 is mounted on a threaded outer end 72 of the shaft section 32 and it is provided with a flange 73 for engaging an outer side 74 of said annular member, whereby the latter may be clamped in position.

An outer side 75 of the annular member 65 co-acts with an inner surface 76 of a rim 77 for the wheel 12, an outer surface 78 of said wheel being movable over a metallic supporting surface 79. The wheel 12 is provided with a hub 81 and a web portion 82 extending therefrom to the rim 77. The web portion 82 may be provided with a plurality of openings 83 affording access to the friction element 66 from an outer side 84 of the wheel. The openings 83 are preferably of such dimensions that the nut 71 may be removed and the annular member 66 withdrawn therethrough, thus avoiding the necessity of disturbing the shaft section 32 when a worn friction wheel is to be replaced. The particular construction thus described affords in effect a protective housing for the driving element 33.

The wheel 12 may be operatively associated with the adjacent eccentrically disposed bearing 62 by means of a shaft 85 having an outer shaft section 86 journaled in bearings 87 positioned in the hub 81 of said wheel 12, and also having an eccentrically disposed shaft section 88 positioned within the bearing 62 and terminating in an end portion 89 provided with a downwardly projecting arm 91. The wheel 13, which is positioned on the opposite side of the car, is also provided with a shaft 92 and similar eccentrically disposed sections 93 and 94 terminating in a depending arm 95.

When the arm 91 is actuated, by reason of the eccentric bushing 62 the car platform 2 as a whole but more especially the side 9 thereof is moved vertically. The relative positioning of the frictional driving element 33 and the inner side 76 of the rim 77 of the wheel 12 are such that a predetermined movement of the arm 91 causes a movement of the element 33 into engagement with the rim 77. The parts are so adjusted, however, that the movement of the platform on the opposite side of the car is not sufficient to actuate the friction element 34 into engagement with the wheel 13. Thus the wheel 12 may be connected and disconnected at will to and from the driving friction element 3 independently of the opposite traction wheel 13. Similarly, a movement of the arm 95 causes a movement of the opposite friction element 34 into effective or ineffective positions with respect to the wheel 13 independently of the wheel 12.

In accordance with my invention, the driving friction elements 33 and 34 are operated, as just described, through mechanism 96 controlled by an operator from the front end of the car. To this end I provide a mounting for a rotary sectional steering post 97, as particularly shown in Fig. 1. A base section 98 comprises a vertical shaft 99 which is journalled in a bearing 101 and is supported by bolts from the underside 21 of the platform 2. A steering wheel 102 is mounted by a spindle 103 between forks 104 projecting beyond a portion 105 of the base section 98.

The base section 98 of the steering post 97 may be actuated by a swinging section 106 of the rotary steering post 97, the section 106 being connected at a lower end 107 to an adjacent upper end 108 of the base section 98 through a universal joint 109. The latter thus permits a horizontal swinging movement of the upper swinging post section 106 upon the application of force to a handle 111 thereof and also a rotary movement of both the upper swinging section 106 and the lower vertical section 98 when a turning force is applied to the handle 111. The resulting angular movement of the wheel 102 occurs about a vertical axis and does not involve a tilting of said steering wheel from one face edge to the other as in the prior art devices. The latter method, involving the tilting operation, necessitated numerous replacements caused by the breaking of the steering fork stems and the damaging of the steering wheels, and it was to avoid such undesirable results that my present sectional steering post was developed.

The universal joint 109 may be enclosed by a casing 112 which is supported on the platform 2 and provided with an opening 113 (Fig. 1) at its upper end elongated sufficiently to permit the desired swinging movement of the steering post section 106, but of such dimensions as to function as a support tending to prevent undesirable lateral movements of said section 106. The swinging movement of the post section 106 may be further steadied by a lever 114 fulcrumed at 115 on a rearwardly projecting portion 116 of the casing 112. An upper end of the lever 114 is fulcrumed at 117 to a sleeve 118 mounted on the swinging section 106, while a lower end 119 extends through an opening 121 in the platform 2 and is provided with a portion 122 extending below the underside of the opening 121 of the platform 2. The swinging section 106 may be normally maintained in a vertical position in alignment with the base section 98 by means of a spring 123, one end of which is secured to the lower end portion 122 of the lever 114, and an opposite end of which is secured to a strap member 124.

Figure 2:
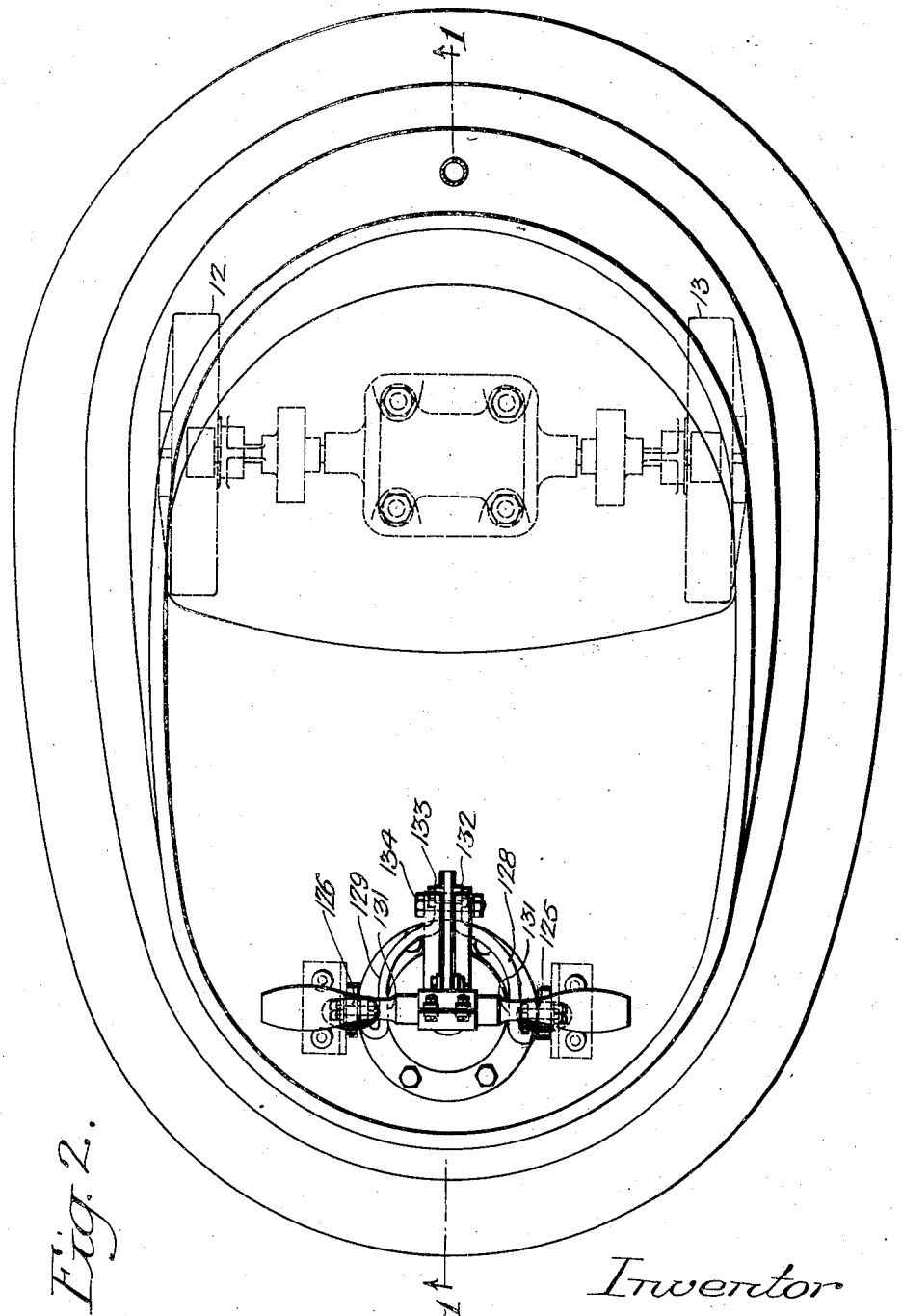
Fig. 2 is a top plan view of the structure of Fig. 1.

The swinging movement of the post section 106 by the handle 111 may be supplemented by means of a pair of pedals 125 and 126 respectively positioned on opposite sides of the casing 112 and pivotally mounted on brackets 127 (Fig. 5) secured to the underside 21 of the platform 2. The brackets 127 may also constitute integral extensions of the bearing casting 101. Straps 128 and 129 have corresponding inner ends 131, 131 thereof connected to inner sides of the foot pedals 125 and 126 and corresponding opposite ends 132 and 133 to the lever 114 by pivot bolt 134 at a point between the lower end 121 of said lever 114 and the fulcrum point 115 thereof. When a force is applied to the pedals 125 and 126, the lever 114 is actuated about its fulcrum point 115 causing a movement of the upper end thereof about the fulcrum point 117 and hence a corresponding movement of the swinging post section 106. The base section 98, however, is not affected since the latter may be actuated only by a rotary movement of the upper post section 106. The inner ends 131 (Figs. 2 and 5) of the strap members may be positioned in such proximity to the sides of the casing 112 as to prevent the transverse movement of the pedals 125 and 126 during operation and thereby steady the same.

The movement of the lever 114 incident to the swinging of the post section 106 may be transmitted to the arms 91 and 95 to cause a corresponding movement of the driving friction elements 33 and 34 from one desired position to another through linkage 135 which constitutes one part of the aforementioned mechanism 96. The linkage 135 includes a strap 136 which is mounted on the underside 21 of the platform 2 in the longitudinal plane of the car by means of the strap member 124 which embraces the same. An opposite end 137 is slidably supported in a recess 138 (Fig. 1) formed in the main motor supporting bracket 17. An aperture 139 is formed in the strap 136 through which the end 122 of the lever 114 passes. A member 141 (Figs. 3 and 4) comprising oppositely extending arms 142 and 143 and a transversely extending arm 144 is centrally pivoted at 145 to the strap member 136, the latter affording a supporting surface for the member 141 upon a pivotal movement thereof. The arms 142 and 143 may be guided by straps 146 and 147 having guiding surfaces 148. A pair of rods 149 and 151 have corresponding ends 152 and 153 respectively secured by pivot bolts 154 to the ends of the arms 142 and 143.

Opposite ends 155 and 156 of the rods 149 and 151, respectively, are secured through resilient means 157 and 158 to the arms 91 and 95 connected to the eccentric shaft sections 88 and 94, said resilient devices causing the driving elements 33 and 34 to engage resiliently the driving wheels 12 and 13, respectively. Considering said resilient devices in greater detail, the resilient device 157 includes a spring 159, one end of which abuts against a nut 161 secured on a rear end 162 of the rod 149. An opposite end abuts against one side of the arm 91. An abutment 163 abuts one side of the arm 91. The force of the spring 157 is such that upon a forward movement of the rod 149, the spring 159 compresses to permit a relative movement to obtain between said rod 149 and the arm 91, establishing a space between the latter and the abutment 163. When said space between the adjustable abutment 163 and the arm 91 has reached approximately a desired value, the compressive force of the spring 159 has reached such value that the further actuation of the rod 149 causes a turning of the arm 91 and the consequent raising of the adjacent side 9 of the car platform by reason of the eccentricity of the bearing 62 and its shaft section 88 with respect to the driving wheel 12. The resulting movement causes the actuation of the frictional driving element 33 and the resilient engagement with the adjacent working surface 76 of the rim 77 of the wheel 12. The other resilient device 158 is identical with the device 157 just described, the operation of the rod 151 resulting in the turning of the eccentric shaft section 94 and the consequent resilient engagement of the frictional driving element 34 with the rim of the driving wheel 13.

When the swinging post section 106 is in the normal neutral position of Fig. 1 by reason of the force of the spring 156, each of the arms 91 and 95 are in the position shown in Fig. 6, the driving friction elements 33 and 34 being disengaged from their co-operating wheels 12 and 13. When it is desired to place the car in motion, assuming the motor 22 energized and the driving friction wheels 33 and 34 actuated, the swinging post section 106 is moved rearwardly against the force of the spring 123, as well as the resilient devices 157 and 158. The springs in each of these devices compresses a desired amount during the movement of the steering post until the force thereof is sufficient to cause the turning of the shafts 85 and 92, respectively. The operation of the latter causes the simultaneous raising of the platform 2 from both sides thereof and the consequent resilient engagement of the driving elements 33 and 34 with the wheels 12 and 13, respectively. When the post section 106 is released, the parts assume their original position, with the driving friction elements 33 and 34 disengaged from the car wheels 12 and 13, as shown in Fig. 6.

The energization of the motor 22 may be effected by means of a trolley pole 164, which extends from the car platform 2 to an overhead charged ceiling (not shown). The circuit of the motor may be completed by grounding one terminal thereof to the bracket member 17 which in turn is electrically connected to the metallic floor surface through the metallic driving wheels and associated shafting.

My invention further contemplates mechanism whereby the car may be turned on a circle of its own length in either direction with a minimum effort on the part of the driver. To this end, I provide a link 165, a forward end 166 of which is pivotally mounted to a rearward extension 167 of the steering post base section 98. An opposite end 168 is provided with a slot 169 for a pivot bolt 171 secured to the bracket member 17 in alignment with the strap member 136. The length of the slot 169 is determined by the desired extent of the angular movement of the steering wheel 102. The movement of the link 165 may be transmitted to the pivot member 141 by means of a bolt 172 extending from the arm 144 of said member 141 through an elongated slot 173 in said link 165. Thus a movement of the steering wheel from one angular position to another causes a corresponding movement of the pivoted member 141 and the consequent opposite movement of the rods 149 and 151 previously described as being actuated by the swinging section 106.

Figure 4:
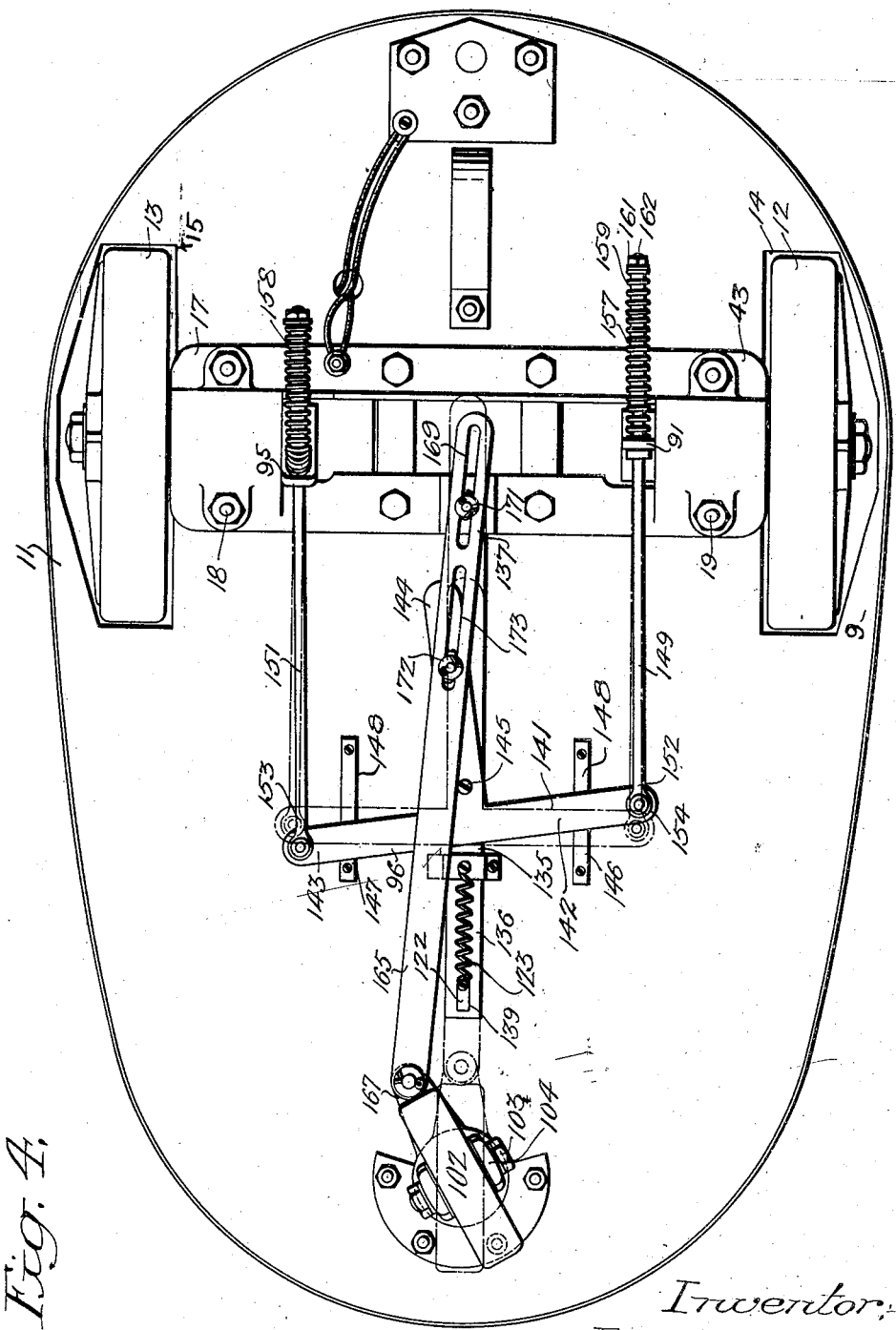
Fig. 4 is a view similar to Fig. 3, but showing the position of the control linkage when the swinging section of the steering post is moved from the position of Fig. 2.

Should the steering wheel 102 be turned from the dot-and-dash line position of Fig. 4 into the solid-line position of Fig. 3, by a rotary movement of the steering post 97, the member 141 is pivoted about the fulcrum point 145 causing a forward movement of the rod 151 and rearward movement of the rod 149, the former movement causes the compression of the spring 156 of the resilient means 158 and a predetermined movement of the operating arm 95 and consequently the movement of the driving element 34 toward the car wheel 13. The rearward movement of the rod 149 causes an opposite movement of the lever 91 away from the mid position due to the engagement of the stop 163 therewith. Should the post section 106 be now swung rearwardly by the operator into the dot-and-dash line position of Fig. 5, the member 141 is carried forwardly in the angular position illustrated causing equal movements of the rods 149 and 151 and corresponding actuations of the lever arms 91 and 95 associated therewith. The displacement incident to the tilting of the steering wheel 102 just described is adjusted so that the subsequent forward movement thereof by the swinging rearwardly of the post section 106 causes only the friction wheel 34 to engage the car wheel 13, the car wheel 12 remaining loose on its shaft. The car thus turns about this wheel as a pivot.

Should the steering wheel 102 be actuated into the dot-and-dash line position of Fig. 3 with the post section 106 in its rearward position shown in dot-and-dash lines in Fig. 5, the member 141 is tilted in the opposite direction to that shown in the drawing causing opposite movements of the rods 149 and 151 and consequent disengagement of the driving element 34, from the wheel 12, the driving element 33 being actuated into engagement with its co-operating wheel 12. The subsequent release of the post section 106 causes the disengagement of the driving element 34 from the car wheel 12 and the arrangement of the mechanism 96 in position just opposite to that shown in Fig. 3.

If the weight of the operator is less than average, the additional force of the spring causes the engagement of the driving element with its traction element with a force of such value as to prevent the occurrence of slippage between these elements in the event of the stalling of the car. The damaging of the main driving motor 22, however, is prevented by the operation of the friction clutch which permits a relative movement to occur between the motor shaft section 26 and the friction shaft section 32.

While I have shown only one form of embodiment of my invention, for the purpose of describing the same and illustrating its principles of construction and operation, it is apparent that various changes and modifications may be made therein without departing from the spirit of my invention, and I desire, therefore, that only such limitations shall be imposed thereon as are indicated in the appended claims or as are demanded by the prior art.

I claim:

1. In combination, a car body, a traction element, a shaft having eccentrically disposed sections respectively associated with said car body and said element, and steering means operable to effect a movement of said shaft, whereby said car body may be moved bodily relative to said element.

2. In combination, a car body, a traction element, a shaft having eccentric sections respectively associated with said body and said element, steering means for the car, and means operative upon a movement of said steering means to cause the actuation of said shaft section and the bodily movement of said car body, said last-mentioned means including a resilient device and means for compressing said device, so that a force may be exerted on said shaft.

3. A car body, a traction element, means for so associating the same that a relative bodily movement therebetween may obtain, a driving element so carried by said car body and so positioned as to be actuated into engagement with said traction element at a predetermined point in said movement, steering means for said car, and means operably associating said steering means and said first-mentioned means including a resilient device, the force of which is sufficient to cause said relative movement.

4. In combination, a supporting structure, a traction element, means for so associating the same that a predetermined relative movement may obtain upon the operation thereof, a driving element carried by said structure and so positioned as to be actuated into engagement with said wheel during said predetermined movement, steering means for said structure, and mechanism extending between said steering means and said first-mentioned means for causing the operation thereof, said connecting means including a resilient device, the force of which is sufficient to cause said relative bodily movement as well as the engagement of said driving element with said traction element with a desired force.

5. In combination, a car body, a traction wheel, a shaft having eccentric sections respectively associated with said car body and said traction wheel, steering means for said car, linkage extending between said steering means and said first-mentioned shaft section including resilient means, the force of which is sufficient under predetermined conditions to cause a movement of said first-mentioned shaft section, and a driving element so positioned on said car body as to be actuated upon a movement of said first-mentioned shaft section into desired engagement with said traction wheel.

6. A car body, a traction wheel, means for so associating the same that said car body may be actuated relative to said traction wheel, a driving element for said traction wheel movable into engagement with said wheel upon said relative movement, operating means for said first-mentioned means including a resilient device, the force of which is sufficient to cause said relative movement and the engagement of said driving element with said traction wheel, driving means for said element, and a clutch interposed therebetween effective under predetermined operating conditions.

7. A car having a traction element, a relatively movable driving element therefor, actuating mechanism for said driving element including a member having spaced abutments, a second member movable between said abutments, and resilient means extending between one of said abutments and said second member tending to actuate the latter into engagement with the other abutment.

8. A movable device having a traction element and a relatively movable driving element, control mechanism for said driving element including an actuating member having spaced abutments, an actuated member movable therebetween, and resilient means extending between one of said abutments and said actuated member tending to force the latter into engagement with the other abutment.

9. A car body having a traction element, a shaft having eccentric sections respectively associated with said car body and said traction element, operating mechanism for at least one of said shaft sections including an operating member having spaced abutments, an operated member movable between said abutments, and resilient means extending between one of said abutments and said operated member.

10. A car body having a traction element, a shaft having eccentrically disposed sections respectively associated with said car body and said traction element, operating mechanism for the shaft section associated with said car body including an operating member having spaced abutments, an operated member extending from said last-mentioned shaft section and movable between said abutments, and resilient means extending between one of said abutments and said operated member for actuating the latter into engagement with the other abutment, the force of said spring being such that the latter abutment is actuated relative to said operating member until the force of said spring is sufficient to cause a movement of said last-mentioned shaft section.

11. In combination, a supporting structure, a wheel, a shaft having eccentric sections, one of said sections being associated with said wheel and another with said structure, a driving element movable into engagement with said wheel upon a predetermined movement of said last-mentioned shaft section, actuating means for the latter including an operating member having spaced abutments, an operated member extending from said last-mentioned shaft section and movable between said abutments, and resilient means extending between one of said abutments and said operated member, said resilient means having such force upon a movement of said operating member as to cause the actuation of said last-mentioned shaft section.

12. In combination, a supporting structure, a wheel, a shaft having eccentric sections, one of said sections being associated with said wheel and another with said structure, a driving element movable into engagement with said wheel upon a predetermined movement of said last-mentioned shaft section, actuating means for the latter including an operating member having spaced abutments, an operated member extending from said first-mentioned shaft section and movable between said abutments, and resilient means extending between one of said abutments and said operated member, said resilient means being compressed upon a movement of said operating member until the force thereof is sufficient to cause the actuation of said last-mentioned shaft section.

13. A car body having a motor provided with a driven element and an interconnected clutch, a traction element, a shaft having eccentric sections respectively associated with said car body and said element, and means for operating said shaft to vary the effect of said driving element on said traction element, said means including an operating member and spaced abutments, an operated member extending from one of said shaft sections and movable between said abutments, and resilient means extending between one of said abutments and said operated member.

14. In combination, a car body having a motor provided with a driven element and an interposed clutch, a traction element, a shaft having eccentrically disposed sections respectively associated with said car body and said traction element, a steering post, and means operative upon the actuation of said post to cause a movement of said shaft sufficient to cause said driven element to engage said traction element, said means including an operated member resiliently associated with said shaft.

15. A car having a traction element, a relatively movable driving element for said traction element, bodily movable steering means for said car, mechanism for operatively associating said steering means and said driving element whereby a movement of the former from one position to another causes a movement of the latter into engagement with said traction element, and means responsive to a predetermined movement of said steering means while in said last-mentioned position for causing such actuation of said mechanism as to move said driving element out of engagement with said traction element.

16. A car having a driving wheel, a driving floor-engaging element for said wheel, a rotary swinging steering post, provided with a steering wheel, means responsive to a swinging movement of said post for actuating said driving element into an effective position relative to said driving wheel, and means responsive to a predetermined rotary movement of said steering wheel for further actuating said driving element into an ineffective position.

17. A car having a driving wheel, a driving element for said wheel having effective and ineffective positions, a two-part steering post provided with a floor-engaging steering wheel, of which one part is mounted to swing relative to the other, means responsive to a swinging movement of said part to actuate said driving element from one of its positions to the other, and means responsive to a rotary movement of said wheel for also causing an opposite movement of said driving element.

18. A car having a pair of wheels, a pair of driving elements therefor movable into effective and ineffective positions, a rotary swinging steering post provided with a floor-engaging steering wheel, means responsive to a swinging movement of said post for causing a movement of said driving elements from one position to another, and means responsive to a rotary movement of said steering wheel for causing an opposite movement of said driving means.

19. A car having a pair of wheels, a pair of driving elements for said wheels, respectively, steering means for said car having differential movements, said steering means including a floor-engaging steering wheel, means responsive to a movement of said steering wheel for causing opposite movements of said driving elements, and means responsive to another movement of said steering means for causing corresponding movements of said driving elements.

20. A car body having a pair of wheels, a pair of driving elements for said wheels movable into and out of engagement therewith, steering means for said car having rotary and swinging movements, means responsive to one of said movements for establishing a desired resilient engagement between said driving elements and said driving wheels, and means responsive to the other movement for causing only one of said driving elements to remain in said resilient engagement.

21. In combination, a car body having a bearing, a pair of wheels provided with bearings, a shaft, individual to each wheel having eccentrically disposed sections respectively associated with one of said car-body bearings and the wheel bearing, a pair of driving elements carried by said car body positioned in predetermined relation to said wheels, steering means, means responsive to a predetermined movement of said steering means for actuating said driving elements into resilient engagement with said wheels and means responsive to another movement of said steering means, whereby only one of said resilient engagements may be maintained.

22. A car body having a bearing, a pair of wheels therefor provided with bearings, shafts for said wheels, at least one of said shafts having eccentrically disposed sections respectively associated with a wheel bearing and a car-body bearing, driving elements for said wheels, a rotary swinging steering post, means extending between said steering post and said shafts for establishing a resilient engagement between said driving elements and said wheels under predetermined operating conditions, and means also responsive to said steering means for causing one of said elements to engage its wheels with a greater force than the other element.

23. In combination, a pair of operating rods having corresponding ends mounted on a member, a pair of operated members having resilient lost-motion connections to said rods, an actuating member affording said first-mentioned member a pivotal mounting bodily movable with respect to said pair of operated members, and actuating means for said first-mentioned member.

24. A pair of members to be actuated, a pair of actuating members having lost-motion connections therewith, a main bodily-movable actuating member relatively movable with respect to the members to be actuated, a link affording pivotal supports to said second-mentioned members, said link being pivotally mounted on said main actuating member and bodily movable therewith, and means whereby said second mentioned members may be oppositely moved.

25. A pair of rotatable elements, a pair of rods having resilient lost-motion connections therewith, a link affording pivotal supports to said rods, means for bodily actuating said rods and said link, and means for tilting said link to cause opposite movements of said rods whereby the relative position of said rotatable elements may be adjusted.

26. Steering means having movements about different axes, a pair of elements to be actuated, a primary member responsive to one of said movements, a member pivotally mounted on said primary member and having oppositely extending arms, links respectively mounted on said arms and having lost-motion connections to said elements respectively, and means responsive to another movement of said steering means for causing opposite movements of said links.

27. Steering means having a plurality of movements, a pair of elements to be actuated, a primary member connected to be actuated by said steering means upon one of the movements thereof, a second member pivotally mounted on said first-mentioned member and provided with arms, a pair of links extending from said arms and having resilient lost-motion connections with said elements, respectively, and a link having such operative connection with said second member that another movement of said steering means causes opposite movements of said links.

28. A car, steering means therefor having a plurality of movements, a pair of shafts provided with projecting elements, a primary member responsive to one of the movements of said steering means, a member pivotally mounted thereon having links extending therefrom, means whereby said links may have resiliently lost-motion connections with said elements, respectively, and a third pivoted link extending from said steering means and so associated with said second member that upon another movement of said third means said shafts are oppositely actuated.

29. A car body having a rotary steering post, one section of which is adapted to provide a mounting for a steering wheel, another section being so connected to said first-mentioned section as to have a swinging movement, driving mechanism for the car, means responsive to a swinging movement of said second-mentioned section for causing a rectilinear movement of said car, and means responsive to the turning of said first-mentioned section for controlling the operation of said driving mechanism so as to facilitate the turning of said car.

30. In a car, the combination with a steering wheel for said car, of a rotary steering post having a swinging section mounted on the car and adapted to provide a mounting for a steering wheel, a driving motor, a pair of traction elements driving said car, control means responsive to a swinging movement of said post section to cause both of said traction elements to be actuated to drive the car, and means operative on said control means in accordance with the rotary movement of said steering post to vary the driving effect of one of said traction elements with respect to the other.

JOSEPH C. LUSSE.